United States Patent [19]
Ricketts et al.

[11] Patent Number: 5,599,162
[45] Date of Patent: Feb. 4, 1997

[54] TRANSVERSE BLOWER FAN ASSEMBLY

[75] Inventors: Jonathan E. Ricketts, Viola; Robert A. Matousek, Milan; Dan J. Burke, Moline, all of Ill.

[73] Assignee: Case Corporation, Racine, Wis.

[21] Appl. No.: 513,013

[22] Filed: Aug. 9, 1995

[51] Int. Cl.⁶ ..................................................... F04D 5/00
[52] U.S. Cl. ........................................ 415/53.1; 416/187
[58] Field of Search ........................ 415/53.1; 416/187; 460/100, 101

[56] References Cited

U.S. PATENT DOCUMENTS

| | | | |
|---|---|---|---|
| 3,141,607 | 7/1964 | Masters | 415/53.1 X |
| 3,223,313 | 12/1965 | Kinsworthy | 415/53.1 |
| 3,276,415 | 10/1966 | Laing | 415/53.1 |
| 3,385,511 | 5/1968 | Wentling | 415/53.1 |
| 3,635,588 | 1/1972 | Lester et al. | 416/187 |
| 3,664,349 | 5/1972 | Quick | 415/53.1 |
| 3,804,548 | 4/1974 | Hubert et al. | 415/53.1 |
| 3,828,531 | 8/1974 | Quick | 415/53.1 |
| 4,208,858 | 1/1980 | Rowland-Hill | 460/100 |
| 4,712,568 | 12/1987 | Strong et al. | 460/101 |
| 4,906,219 | 3/1990 | Matousek et al. | 416/187 X |
| 5,041,059 | 8/1991 | Ricketts et al. | 460/101 |
| 5,165,855 | 11/1992 | Ricketts et al. | 416/187 X |

FOREIGN PATENT DOCUMENTS 4-183993   6/1992   Japan ................................ 415/53.1 X Primary Examiner—Edward K. Look
Assistant Examiner—Michael S. Lee
Attorney, Agent, or Firm—John W. Harbst

[57] ABSTRACT

A transverse fan assembly including a fan rotatably disposed in an air plenum for driving air through an inlet opening and forcing air from an outlet opening defined by the air plenum. The fan includes an elongated axis of rotation defined by a central hub. A plurality of elongated fan blades extend in an axial cylindrical pattern about the hub to define an open-center fan. The fan further includes two disk-shaped fan blade mounting members arranged toward opposite ends of the fan. Each blade mounting member is connected to and extends radially from the hub. The fan blades are connected to and driven by the blade mounting members whereby establishing an air flow through the inlet opening and from the outlet opening. Each fan blade mounting member is apertured to allow air to be drawn endwise and inwardly through the fan mounting members to the open center of the fan from whence the air is exhausted by the rotating fan blades in a manner eliminating end air effects and providing a substantially even flow of air from the outlet of the air plenum and along the length of the fan.

12 Claims, 6 Drawing Sheets

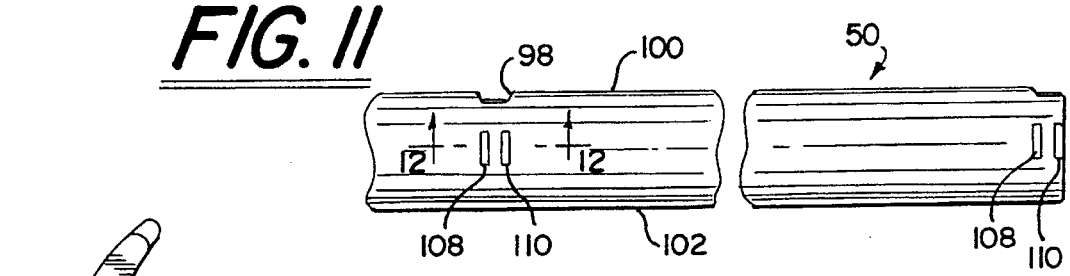
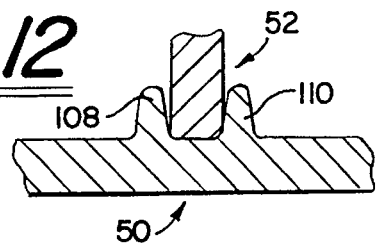
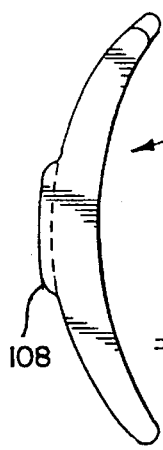
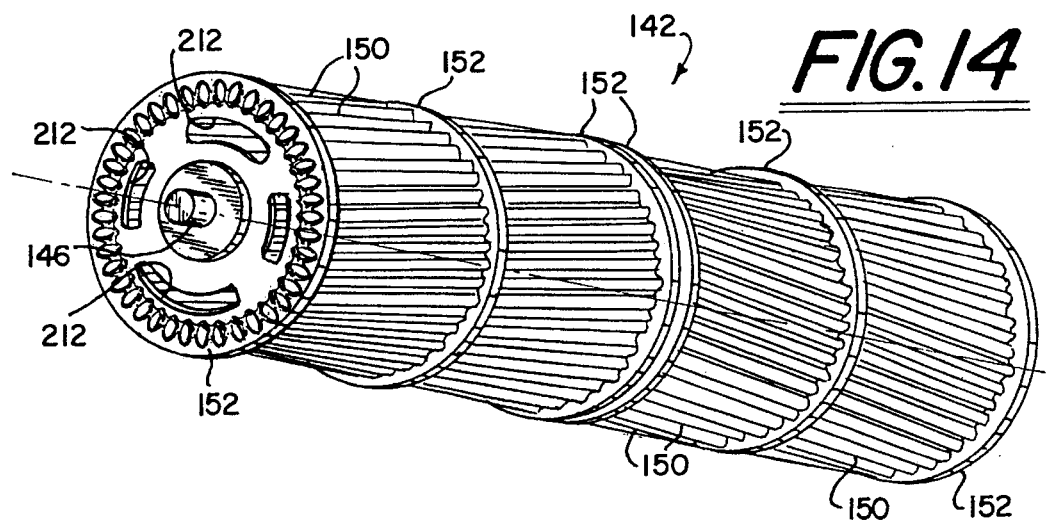
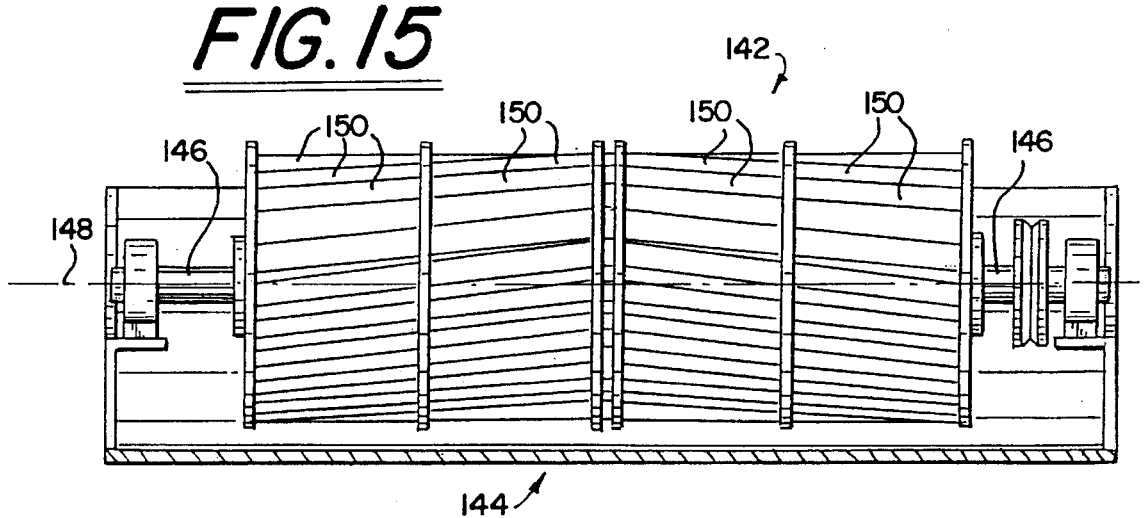

TRANSVERSE BLOWER FAN ASSEMBLY

FIELD OF THE INVENTION

The present invention generally relates to a transverse fan assembly and, more particularly, to a transverse fan assembly having a substantially constant output airflow across the entire length thereof. The present invention also discloses a method for eliminating end air effects upon rotation of a transverse fan assembly.

BACKGROUND OF THE INVENTION

Transverse fan assemblies are well known in the art. Transverse or cross-flow fans typically include axially spaced disk-like members that support a plurality of elongated fan blades in a cylindrical pattern or army. As many as thirty-six fan blades may be arranged in a cylindrical arrangement.

Recently, cross-flow fans have been embodied for use with agricultural combines. A typical agricultural combine includes a crop header apparatus which reaps planted grain stalks and then feeds the grain stalks to a threshing apparatus arranged within a body of the combine. The threshing apparatus functions to separate groin from material other than grain. The grain falls through openings in the threshing apparatus. Essentially, most materials other than grain pass toward and are ultimately directed out a rear end of the combine.

While the threshing apparatus acts to separate a substantial portion of the crop or grain from material other than grain, some chaff or straw is directed out through the openings in the threshing apparatus along with the grain, and a further cleaning or separating action is required. Further separation is normally achieved in a cleaning section of the combine.

A typical combine cleaning section includes oscillating cleaning sieves. The cleaning sieves are located below the threshing apparatus to receive the grain and other materials expelled from the threshing apparatus. The oscillation of the sieves arranges the material in a crop mat or veil on top of the sieves. By forcing a stream of air upwardly through the sieves, chaff, straw and other lighter material in the crop material mat is separated from heavier grain, and the chaff, straw and other lighter material is directed out through the rear end of the combine by the air flow. The heavier seeds or grain fall through the sieves for collection.

With the increased power and output demands of modem agricultural combines, cleaning section capacity has become a limiting factor to performance of the combine. The most readily achieved method of increasing combine efficiency is by increasing the size of the cleaning area and the sieves to spread the crop materials across a wider area and in a thinner crop mat or veil.

Increasing the width of the cleaning area also means increasing the width of the combine. Because of the width of fence openings and the size of barn doors and the like, increasing the width of a combine beyond current limits presents significant problems involving everyday combine operation.

Transverse blower fans are particularly useful in combination with combine cleaning sections because they conserve space and produce a wide stream of air that is directed upwardly toward the cleaning sieves of the combine cleaning section. Because the fan in an agricultural combine is disposed closer to the ground over which the combine moves, the fan blades would normally be exposed to engage rocks and other debris. As will be appreciated, rocks and other debris commonly found in fields can be detrimental to the normal high speed rotational operation of the fan blades. Moreover, broken and/or bent fan blades affect fan performance and thereby efficiency of the combine. Accordingly, the fan on a combine is normally protected by a fan wrapper or air plenum. The fan is rotatably mounted within an inner chamber of the air plenum to drive air between an air inlet and an air outlet.

While having a relatively wide output of air, cross-flow or transverse fans are known to have poor "end effect" air characteristics. For purpose of this description "end effect" air flow means the amount of air flow provided at opposite ends of the fan during fan rotation and as compared to relative output air flow along other lengthwise portions of the fan. The affected area can be measured inwardly from opposite ends of the fan and is generally equal to about the radius of the fan.

As will be appreciated, poor end effect air output means that those crop materials disposed toward opposite sides of the sieves does not benefit from the same air flow characteristics as those crop materials disposed toward the lateral center of the sieve. Thus, the effective cleaning area of the combine is significantly reduced by end air effects at opposite ends of the fan. The adverse performance of the fan at opposite ends thereof can be even more detrimental when the combine is operated on a hillside or in other fields having uneven terrain and wherein the frame is tilted such that crop material gravitates toward a lower side of the cleaning sieve. Of course, wrapping an air plenum about the fan exacerbates the air flow problem.

Thus, there is a need and a desire for a transverse fan assembly having a substantially even output of air flow across the entirety thereof with little or no end air effects associated therewith.

SUMMARY OF THE INVENTION

In view of the above, and in accordance with the present invention, there is provided a transverse fan assembly that includes a fan rotatably disposed in an air plenum for drawing air through an inlet opening and drivingly forcing air from an outlet opening defined by the air plenum. The fan includes an elongated axis of rotation defined by a central hub. A plurality of elongated fan blades extend in an axial cylindrical pattern about the hub to defined an opencenter fan. Moreover, the fan includes two disk-shaped fan blade mounting members arranged toward opposite ends of the fan. Each blade mounting member is connected to and extends radially from the hub. The fan blades are connected to and driven by the blade mounting members whereby establishing an air flow through the inlet opening and from the outlet opening. A salient feature of the present invention is that each fan blade mounting member is apertured to allow air to be drawn endwise and inwardly through the fan mounting members to the open center of the fan from whence the air is exhausted by the rotating fan blades in a manner eliminating end air effects and providing a substantially even flow of air from the outlet of the air plenum and along the length of the fan.

Each fan blade mounting member preferably defines an array of circularly arranged slots defined toward the periphery of the mounting member for allowing a fan blade to pass endwise therethrough. Each fan blade releasably locks in a slot to facilitate replacement of the fan blade. Moreover, in a most preferred form of the invention, the slots in the fan mounting members are configured to promote the endwise passage of air through the fan blade mounting members and inwardly toward the open center of the fan to further enhance a substantially even flow of air from the fan.

The air plenum of the fan assembly defines inlet and outlet openings with the fan mounted within an inner chamber for driving air between the inlet and outlet openings. The air plenum further defines opposite open ends to allow air to be drawn into the openings or apertures in the fan blade mounting members. The chamber in which the fan is mounted preferably has a scroll-like configuration with a wall portion of the plenum being proximate to the fan periphery at the inlet opening. The wall portion of the plenum gradually moves away from the fan periphery such that the chamber increases in size as the air is directed toward the outlet opening. As such, the rotating fan in the scroll-like chamber has a tendency to add pressure to the air as it passes to the outlet opening of the air plenum.

In a most preferred form of the invention, each elongated fan blade on the fan slants toward a peripheral center portion of the fan. That is, opposite end portions of each elongated fan blade are arranged in substantial axial alignment relative to each other, while the center portion of the respective blade is circumferentially offset relative to the end portions to provide each fan blade with a chevron-like configuration between opposite ends of the fan assembly. The chevron-like configuration of the blades facilitates the output of a substantially constant output flow of air from the fan assembly.

According to one aspect of the present invention, the fan assembly is arranged as part of a cleaning system for an agricultural combine having a threshing apparatus and cleaning sieves arranged in crop receiving in relation relative to the threshing apparatus. The fan is rotatably arranged on the combine to provide a substantially uniform stream of air across the cleaning sieves, regardless of their width.

As discussed above, the fan includes a plurality of elongated fan blades extending in an axially elongated cylindrical pattern about a central hub defining a fixed axis of rotation for the fan. A plurality of axially spaced and generally aligned disks of substantially uniform diameter are provided for driving the fan blades. Each disk is connected for rotation with and extends radially outward from the central hub. To substantially eliminate end air effects, each disk defines air openings for allowing air to be drawn inwardly at opposite ends and upon rotation of the fan. An air plenum having openings at opposite ends thereof extends parallel to and along substantially the entire length of the fan for directing a forced flow of air from the fan rearwardly and outwardly through the cleaning sieves to blow chaff toward the rear end of the combine.

The air plenum associated with the fan in the cleaning system is specifically designed to direct air upwardly toward the cleaning sieves to effect cleaning action of the crop materials received by the sieves. In this regard, the air plenum includes an upper air directing baffle. The upper air directing baffle of the air plenum extends generally horizontally, rearwardly from a forward edge that is positioned closely adjacent to the rearmost peripheral edge of the fan and upwardly toward the cleaning sieves.

The cleaning fan and air plenum cooperate to produce air velocities which are relatively high across the full length of the sieves to keep the crop mat open and suspended. Such air velocities, however, are not so high that clean grain is prevented from penetrating the clean sieves or is blown out the rear end of the combine and lost. The air openings defined by the disks of the fan reduce or substantially eliminate the end air effects associated with the fan and thereby substantially increase the cleaning area on the sieves, thereby increasing the efficiency and operation of the combine.

Another aspect of the present invention relates to a method of enhancing cleaning of crop materials in a cleaning section of an agricultural combine. The enhanced cleaning method comprises the steps of arranging a transversely elongated cleaning fan in front of and beneath the cleaning section of the combine such that the flow of air from the fan separates the chaff from the grain. The fan includes a plurality of elongated blades arranged in a cylindrical pattern about an elongated rotational axis of the fan. The blades are supported by at least two diskshaped fan blade supports arranged toward opposite ends of the fan. The enhanced method of cleaning further comprises the step of providing openings in the disk-shaped blade supports such that upon rotation of the fan, air is drawn inwardly through opposite ends of the fan, thereby eliminating end air effects and thereby enhancing the cleaning action for the combine by producing a substantially constant flow of air across the entire length of the fan.

These and numerous other features and advantages of the present invention will become readily apparent from the following detailed description, the appended claims, and the accompanying drawings.

BRIEF DESCRIPTION OF THE DRAWINGS

FIG. 11 is an elevational view of another form of a fan blade; FIG. 12 is a fragmentary sectional view taken along line 12—12 of FIG. 11; FIG. 13 is an enlarged end view of the fan blade illustrated in FIG. 11; FIG. 14 is a perspective view of an alternative form of fan; and FIG. 15 is an elevational view of the fan illustrated in FIG. 14.

DETAILED DESCRIPTION OF THE PRESENT INVENTION

Figure 1:
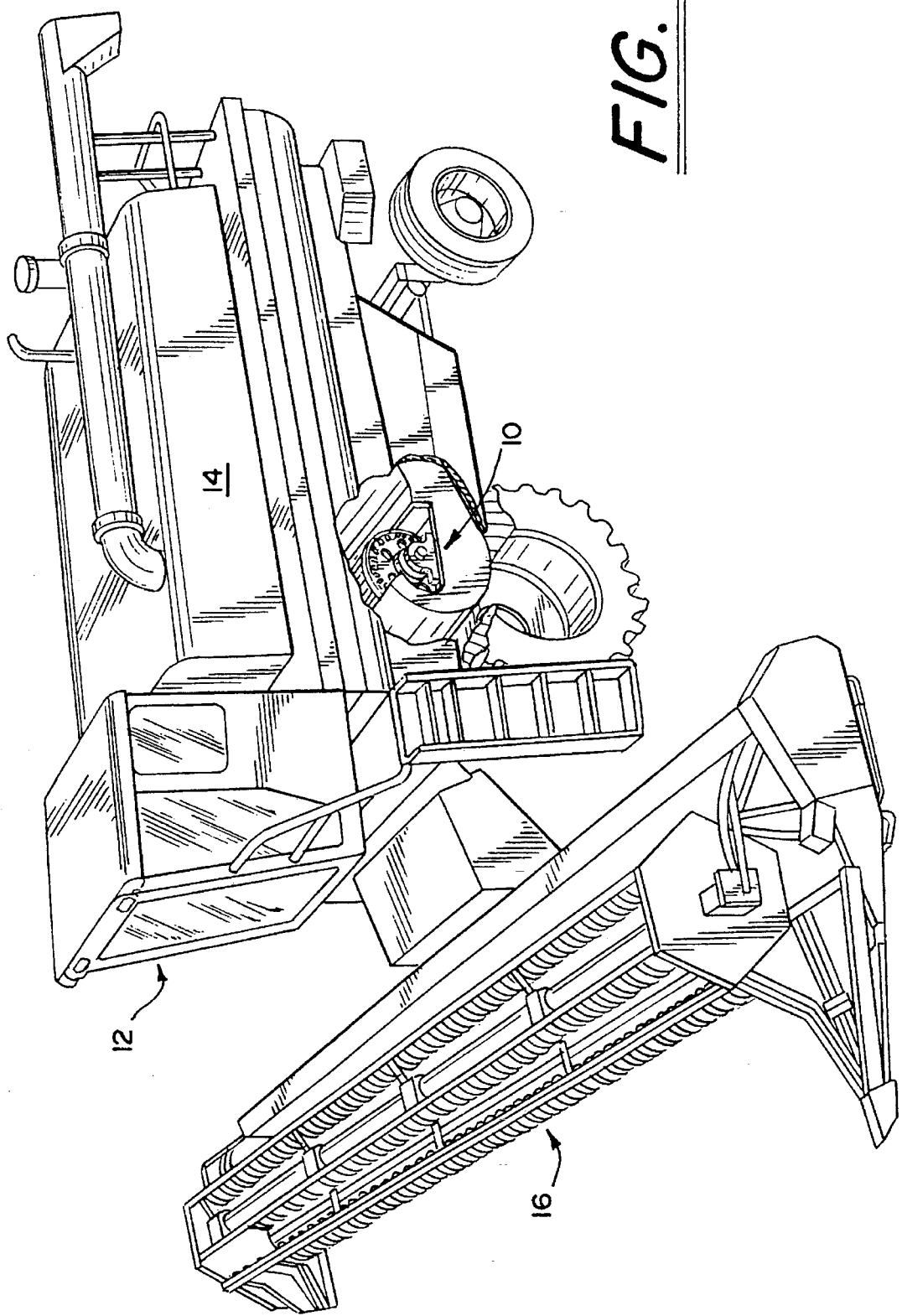
FIG. 1 illustrates a perspective view, partially broken away, of a combine.

While the present invention is susceptible of embodiment in various forms, there is shown in the drawings presently preferred embodiments of the invention which are hereinafter described, with the understanding that the present disclosure is to be considered as exemplifications of the invention, which are not intended to limit the invention to the specific embodiments illustrated.

Figure 2:
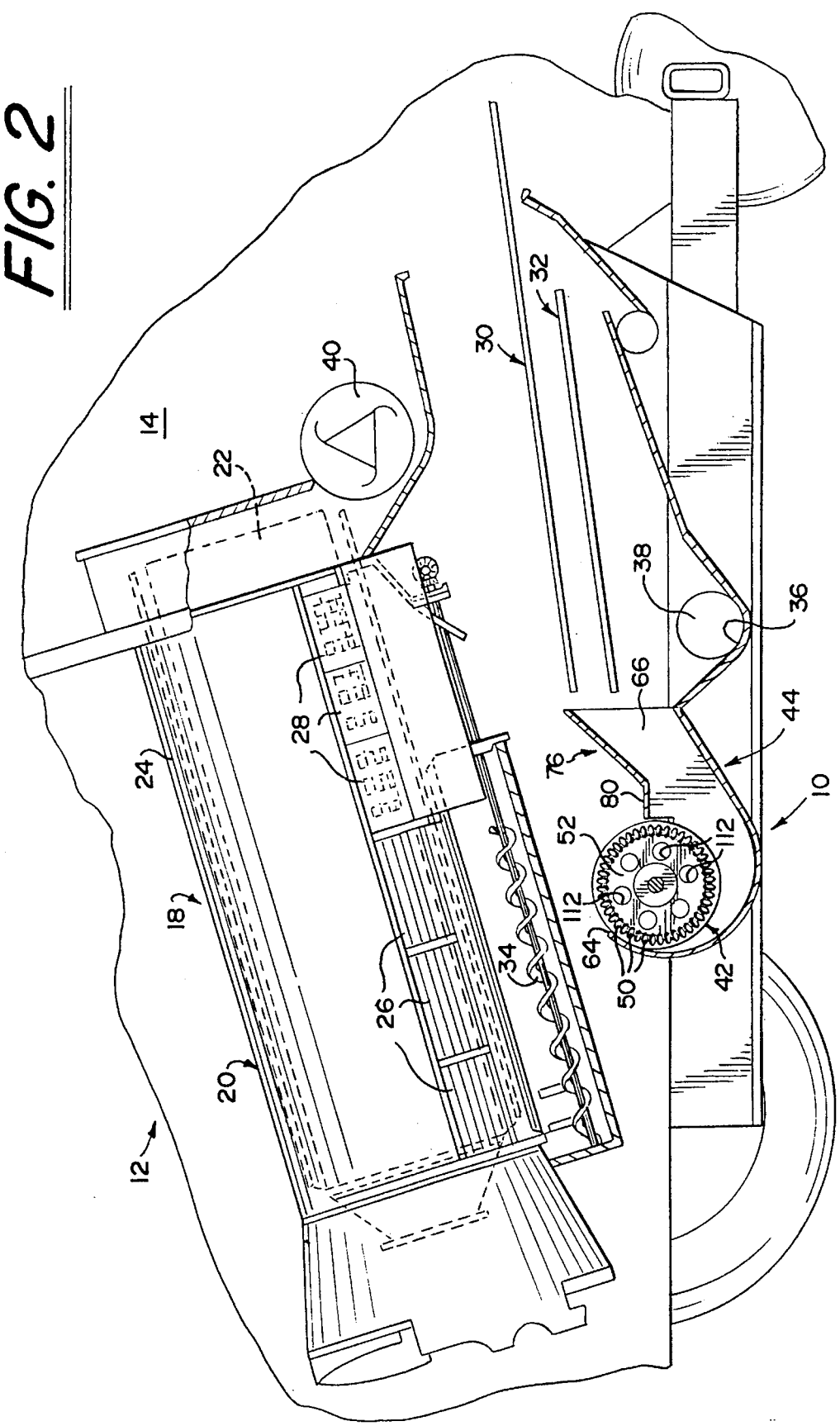
FIG. 2 is a cross-sectional view showing a threshing apparatus and cleaning system of the combine.

Referring now to the drawings, wherein like reference numerals indicate like parts throughout the several views. FIGS. 1 and 2 illustrate a fan assembly 10 according to the present invention arranged in operable combination with a conventional self-propelled agricultural combine 12 of the type sold by Case Corporation of Racine, Wis. It should be appreciated, however, that the principles and teachings of the present invention equally apply to fan assemblies that are used in other agricultural combines or in other applications.

Suffice it to say, the self-propelled combine is operatively powered by an engine (not shown) suitably housed within a body 14 of the combine to provide driving power. The transfer of rotation and power from the engine to various driven components of the combine is of a conventional nature and could include fixed or variable belt or chain drives which are not shown for purposes of clarity.

At its front end, combine 12 is provided with a conventional crop harvesting apparatus or header 16. The crop harvesting apparatus 16 cuts and directs crop material into a conventional threshing apparatus 18 (FIG. 2). As is well known in the art, the threshing apparatus includes a rotor assembly 20, including a relatively large diameter rotor 22 that is mounted within a threshing cage 24. Disposed about the cage 24 is a simple system of concaves 26 and separating grates 28 which, through the action of the rotor 22 and centrifugal force, act to separate grain from the majority of material other than groin and deliver such material to a pair of vertically spaced apart cleaning sieves 30 and 32. In the embodiment shown, auger 34 move groin to the cleaning sieves 30 and 32 defining part of a cleaning area on the combine.

The sieves 30 and 32 are mounted and oscillated to separate the grain from material other than grain. The oscillation of the sieves 30 and 32 arranges the crop materials received from the threshing apparatus 18 in a relatively large crop mat or veil extending across substantially the entire sieve. The heavier grain falls through the sieves 30 and 32 to a clean grain collector 36. An auger 38 directs the grain from the collector 36 into a hopper (not shown). Material which is too large to pass through the concaves 26 and grades 28 is propelled rearwardly through the rotor assembly 20. A conventional beater 40 acts upon the material discharged from the rotor assembly 20. Suffice it to say, the beater 40 propels crop reside from the rear of the rotor assembly 20 and throws it back for discharge from the rear end of the combine.

In the illustrated embodiment of the invention, the fan assembly 10, constructed in accordance with the present invention, is arranged in combination with the cleaning sieves 30, 32. The fan assembly 10 comprises an elongated transverse or cross flow fan 42 and an air plenum 44.

Figure 3:
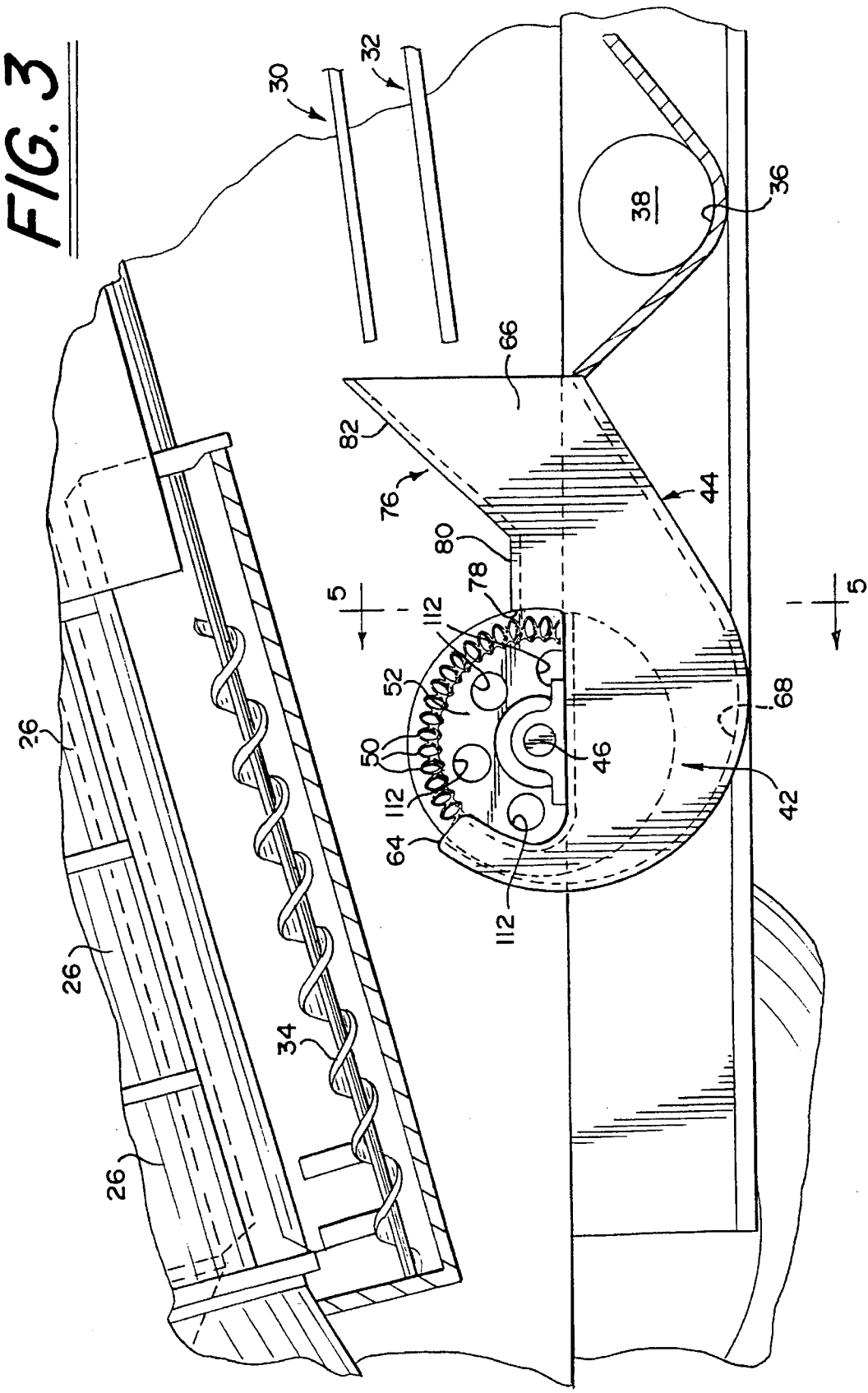
FIG. 3 is an enlarged fragmentary view of the cleaning area of the combine.
Figure 4:
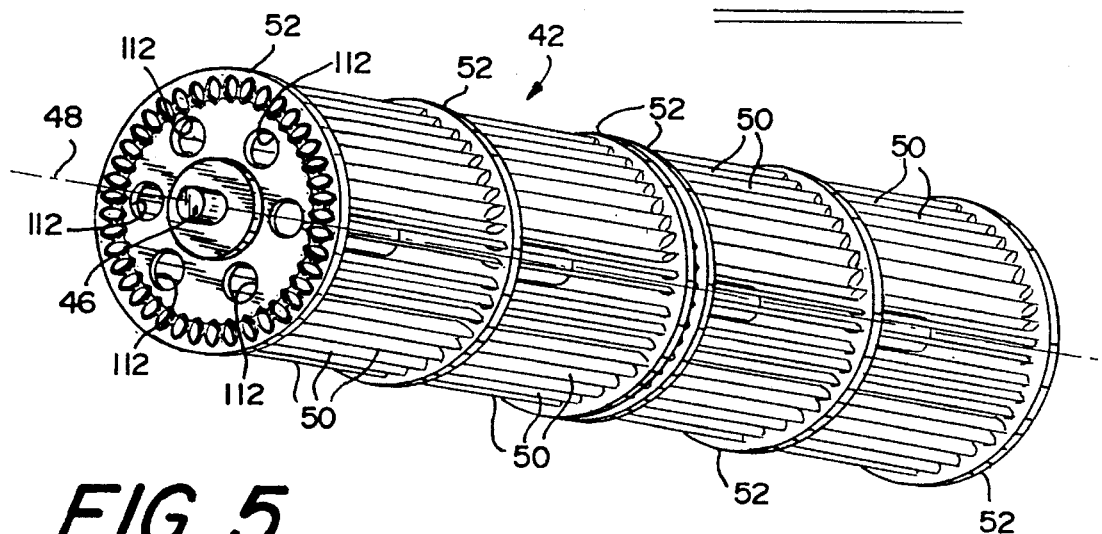
FIG. 4 is a perspective view of a fan assembly according to the present invention.

Fan 42 extends transversely across substantially the entire width of the combine 12. More specifically, fan 42 is transversely mounted on the combine 12 beneath the threshing apparatus 18 and preferably forward of the cleaning sieves 30, 32. As shown in FIG. 3 and 4, fan 42 includes a central and preferably axially elongated hub 46 defining an elongated axis of a rotation 48 for the fan assembly 10, a plurality of closely spaced fan blades 50 extending axially in a circumferential array or pattern about the hub 48 to define an open center for the fan 42, and a plurality of axially spaced and aligned fan blade mounting disks 52. Fan 42 is driven through a variable speed fan drive 54 that includes, as part thereof, a driven pulley 56 fixedly mounted on the hub 46.

Figure 5:
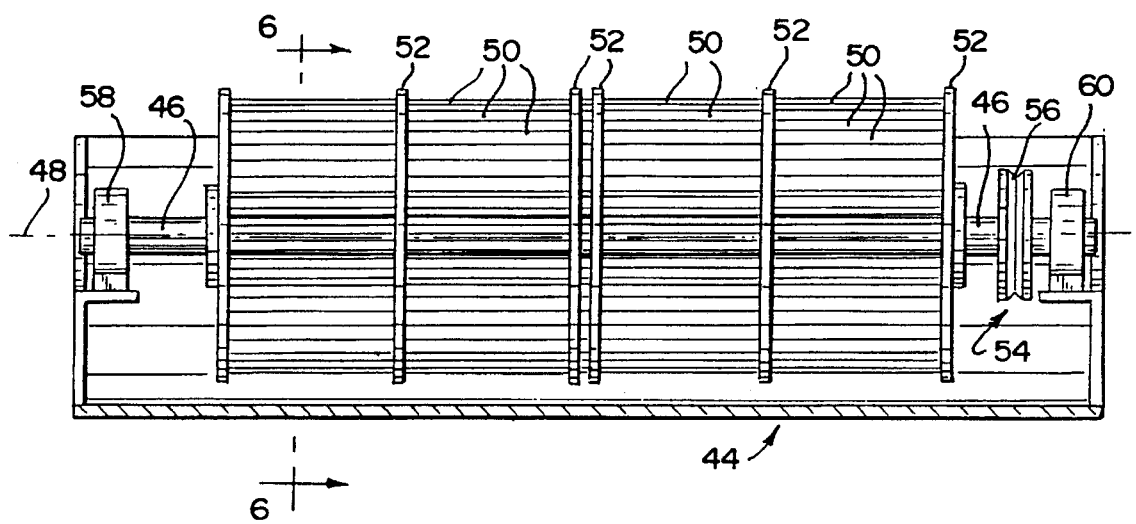
FIG. 5 is a cross-sectional view taken along line 5—5 of FIG. 3.

As shown in FIG. 5, opposite ends of hub 46 are rotatably mounted in bearing blocks 58 and 60. In the illustrated embodiment, the bearing blocks 58, 60 are secured at opposite open ends of the air plenum 44.

Each fan blade 50 of fan 42 preferably has a forwardly curved cross sectional configuration. In a most preferred form the invention, each fan blade 50 is formed from a material such as sheet metal and is connected to the fan blade mounting members or disks 52.

As shown in FIG. 5, the fan blades supporting members or disks 52 are of substantially uniform diameter. A pair of blades supporting members or disks 52 are arranged toward opposite ends of the fan blades 50, with one or more disks 52 being arranged proximate along the length of the fan blades 52. Since the length of the transverse fan 42 is functionally unlimited, other disks may be provided along the length of the fan to counteract centrifugal forces acting on the blades 50 during operation of the fan assembly 10. Each fan blade mounting member 52 is connected to and extends radially outward from the hub 46 for driving the fan blades 50, whereby establishing an air flow through the air plenum 44.

The air plenum 44 extends parallel to and along substantially the entire length of the fan 42. The air plenum 44 is preferably fabricated from an air impervious material such as steel or the like and defines an elongated an air inlet opening 64 and an elongated air outlet opening 66 for directing air discharged therefrom toward the cleaning sieves 30 and 32. The air plenum 44 further defines an internal chamber 68, wherein the fan 42 is rotatably mounted to drive air between the air inlet and air outlet opening 66 and 68 respectively.

Figure 6:
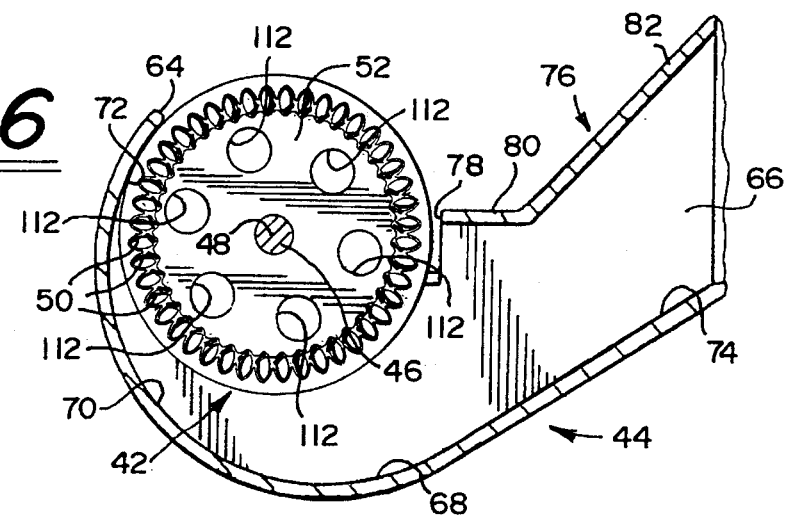
FIG. 6 is an enlarged side elevational view of the fan illustrated in FIG. 4.

As shown in FIG. 3 and 6, the air inlet opening 64 is relatively large in that it opens to about 35% to about 45% of the periphery of fan 42. In a most preferred form of the invention, the air inlet opening 64 defined by the air plenum 44 extends across a top side of the fan 42 and opens to both forward and rearward portions of the fan 42. Advantageously, the air plenum 44 wraps about and extends across the front of the fan 42 to project the fan blades 50 from being damaged by rocks and other debris that are present in the field as the combine moves thereover. It is important to note, however, that opposite ends of the air plenum 44 are open.

In a preferred form of the invention, the chamber 68 defined by the air plenum 44 has a cross-sectional scroll-like configuration. That is, a continuous inner chamber wall 70 defined by the air plenum 44 has an upstream curvilinear face 72 and a downstream curvilinear face 74. At the inlet opening 64, the upstream face 72 of the chamber wall 70 is disposed closely adjacent the periphery of fan 42. Chamber wall 70 increases in distance from the periphery of fan 42 as it leads to the downstream face 74. The downstream face 74 of the chamber wall 70 extends rearwardly and upwardly toward the sieves 30, 32 for directing cleaning air exhausted from the fan 42 theretowards. This configuration of the air plenum chamber 68 is such that the air flow generated by the rotation of the fan 42 pushes upon itself in the area wherein the chamber wall 70 is arranged proximate to the periphery of the fan, thus adding pressure to the air flow generated by the fan 42 and directed upwardly toward the sieves 30, 32.

Air plenum 44 further includes an upper air directing baffle 76 that is preferably formed from a material such as sheet metal that is impervious to the passage of air. The upper air directing baffle 76 defines a leading edge 78 which is positioned closely adjacent a rearmost peripheral edge of the fan 42. Baffle 76 extends rearwardly and upwardly from its leading edge 78. Preferably, baffle 76 includes first and second portions 80 and 82, respectively. The first portion 80 of baffle 76 extends substantially horizontal and rearwardly from the leading edge 78. The first portion 80 of baffle 76 extends rearwardly from the fan 42 and is vertically disposed closely adjacent a horizontal plane passing above but proximate to the rotational axis 48 of fan 42. The second portion 82 of baffle 76 leads rearwardly and upwardly at an acute angle to the horizontal and from the rear edge of the first portion 80 of baffle 76 to direct air exhausted from the fan 42 upwardly toward the sieves 30, 32.

Figure 7:
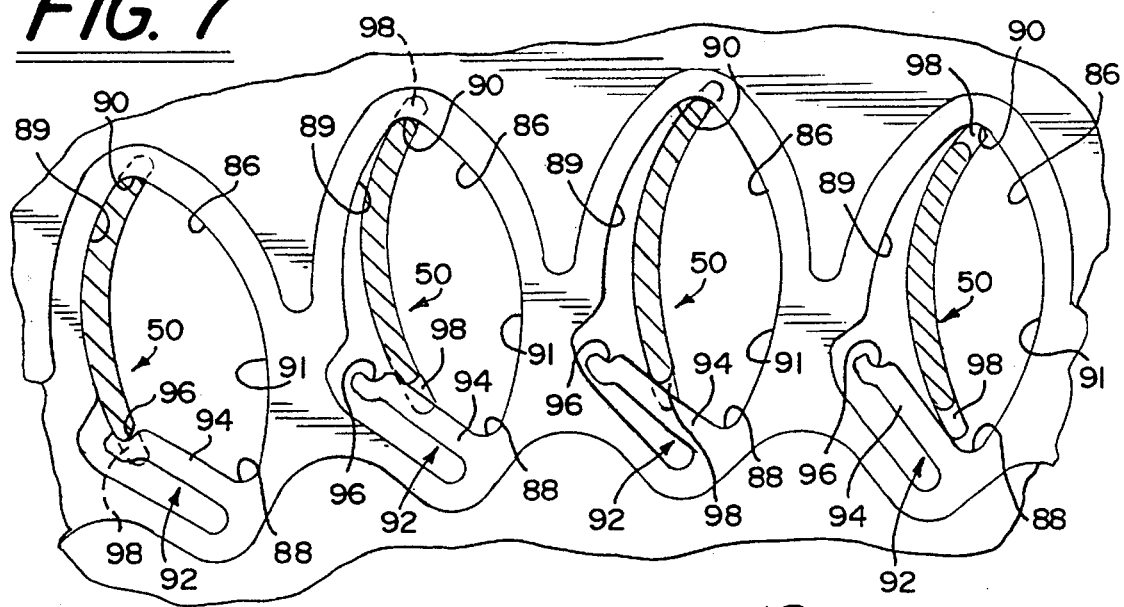
FIG. 7 is an enlarged fragmentary end view showing the fan blades, illustrated in cross section, in different stages for releasable securement.

Turning to FIG. 7, each fan blade mounting disk 52 defines a multiplicity of identical equidistantly spaced fan blade mounting slots 86 that allow a fan blade 50 to extend endwise therethrough. The slots 86 preferably correspond in number to the number of fan blades 50 comprising the fan 42. The slots 86 are arranged concentric with and inwardly of the periphery of the respective disks 52. As shown, each slot 86 preferably has a closed generally elliptical configuration to allow a fan blade 52 to loosely pass therethrough and with radially spaced terminal ends 88 and 90. Preferably, opposing side surfaces 89 and 91 of each slot 86 each have a curvilinear configuration directed outwardly in opposed directions relative to each other.

Each fan blade 50 is independently and releasably secured to a blade mounting disk 52 by a blade retainer 92 that is responsive to an independent twisting action of a fan blade 50 within a respective slot 86. In the illustrated form of the invention, the blade retainer 92 comprises a deflectable arm 94 which projects into each fan blade mounting slot 86. Preferably, each disk is molded from a non-metallic material, and each blade retainer 92 is integrally molded or formed with the disk 52. As shown, each arm or retainer 92 has a cantilevered configuration and extends from the terminal end 88 toward terminal end 90 of slot 86. Toward its free end, each retainer arm 94 is provided with a blade retaining notch 96 for releasably entrapping a radial inner edge of a respective fan blade 50 therewithin. In the illustrated form of the invention, disk 52 and the blade retainer 92 including the series of deflectable arms 84 are integrally formed from a non-metallic material.

As will be appreciated, the radial distance separating the non-deflected position of notch 96 from terminal end 90 of each slot 86 is sized to individually apply a substantially constant radially directed outward force against the respective blade 50, thereby moving the fan blade 50 against the terminal end 90 of a respective slot 86 in a manner releasably holding the blade in position for operation. As shown, each slot 86 is widened in the area of and for a distance substantially equal to the length of the retainer arm 94 to provide for adequate deflection of the retainer arm 92 in response to a twisting action of a fan blade 52 within the slot 86.

Figure 8:
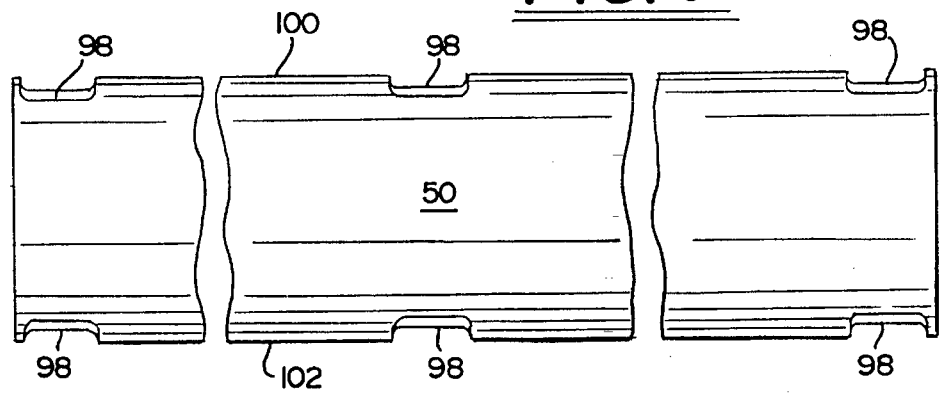
FIG. 8 is an enlarged fragmentary elevational view of a preferred form of a fan blade.
Figure 9:
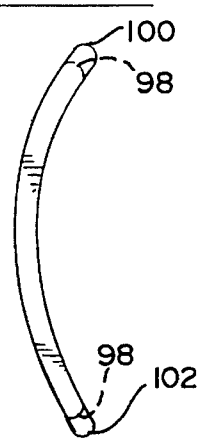
FIG. 9 is an end view of the fan blade illustrated in FIG. 8.
Figure 10:
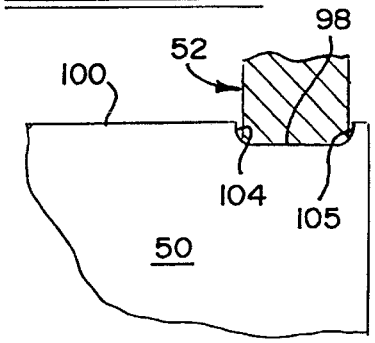
FIG. 10 is a fragmentary elevational view of an end portion of the fan blade illustrated in FIG. 8 shown secured to a blade mounting disk.

Fan 42 is further structured to prevent axial displacement of the fan blades 50 relative to their mounting disks 52 during normal fan operation. Turning to FIGS. 8, 9 and 10, each fan blade 50 is preferably provided with a series of relatively shallow recesses 98 arranged in axially spaced relation along opposite elongated edges 100 and 102. The number and; axial spacing between the recesses 96 corresponds to the number and axial spacing between the fan blade mounting disks 52.

As schematically represented in FIG. 10, each recess 98 defines opposed abutment surfaces 104 and 105 which are axially spaced apart by a distance slightly greater than the thickness of a fan blade mounting disk 52. Thus, when the fan blade 50 is releasably secured to the respective disk 52, registry is obtained between the recess 98 and the opposite sides of the disk 52.

As shown in FIGS. 11, 12 and 13, and to enhance axial blade restraint, each blade may further include raised ridges 108 and 110 which are preferably formed integral with the fan blade 50. The ridges 108 and 110 are arranged in axially spaced relation relative to each other to releasably entrap a fan blade mounting disk 52 (FIG. 12) therebetween and thereby inhibit unwarranted axial displacement of the fan blade 50 relative to the disk 52.

As will be appreciated from the above, each fan blade 50 of the fan 42 is individually and releasably secured within a respective slot 86 on the fan blade mounting disk 52 by the individual blade retainer 92 associated therewith. After freely inserting the fan blade 50 within the slot 86, the fan blade 52 is twisted, thereby causing the cantilevered retainer arm 94 to resiliently deflect. Twisting the fan blade 50 within the slot 86 causes the fan blade 50 to move toward the terminal end of the retainer arm 94. Ultimately, the recess 98 on the blade 50 snaps into the retaining notch 96 at the distal end of the retainer arm 94 thereby releasably and individually securing the fan blade 50 to the disk 52.

As shown in FIG. 7, when blade 50 is releasably locked in place within a slot 86 and relative to a blade mounting member 52, the generally arcuate shape of the slot surface 89 generally corresponds to the arcuate cross-sectional shape of the blade 50 and counteracts the centrifugal forces applied to the blade 50 as a result of fan rotation. Arcuately configuring the surface 91 of each slot 86 in an opposite direction from that of surface 89 increases the width of the slot opening 86 thereby enhancing the ability of air to flow endwise into the open center of the fan 42 in a manner reducing end effect air flow.

To avoid grain from collecting along the sides of the sieve 30, 32, it is important to evenly distribute cleaning air flow across the entire width of the fan. In this regard, a salient feature of the present invention relates to structure for eliminating end air effects of the fan 42. As shown in FIGS. 2, 3, 4 and 6, the fan blade mounting disks 52 are provided with a series of passages or openings 112. The purpose of the passages 112 is to allow air to pass endwise through the disks 52 into the hollow interior of the fan 42 from whence air is exhausted in a manner eliminating end air effects of the fan 42.

As will be appreciated, configuring the plenum 44 with opposite open ends allows air to freely pass toward and be drawn through the openings 112. Accordingly, a substantially constant and even flow of air is provided from the outlet opening 66 of the air plenum 44 along the length of the fan thus providing an adequate stream of air to opposite sides of the cleaning sieves 30, 32 and thereby reducing concerns of whether opposite sides of the cleaning sieves 30, 32 are receiving an adequate flow of cleaning air when the combine operates and moves over terrain having a slanted ground contour. Although circularly shaped openings 112 are illustrated for exemplary purposes, it should be appreciated that the shape of the opening 112 is not essential to eliminate end air effects upon fan rotation.

To further reduce the end air effects normally associated with cross-flow or transverse blower fans, the slots 86 defined by the fan blade supports 52, and through which the fan blades 50 endwise extend, have a configuration that enhances the air flow through the slots 86. In the illustrated embodiment of the invention, the slots 86 defined by the blade supports 52 have an endwise elliptical-like configuration. It should be appreciated, however, that any other suitable configuration for enhancing the air flow to the interior of the fan 42.

Another embodiment of a fan 142 capable of producing a substantially even flow of air across the entire width thereof is schematically illustrated in FIGS. 14 and 15. Fan 142 is rotatably mounted in a manner substantially similar to the mounting for fan 42 and extends substantially across the entire width of the combine 12. Fan 142 is preferably arranged in combination with an air plenum 144 constructed substantially in accordance with the air plenum 44 for drawing air though an air inlet and driving air from an air outlet defined by the air plenum. Fan 142 includes a central hub 146 that defines a rotational axis 148 for the fan 142. A plurality of fan blades 150 extend in an axially elongated cylindrical pattern about the hub 146. The fan blades 150 have a generally curved cross-sectional configuration and are arranged in closely spaced relation relative to each other to defined an opening extending through the center of the fan 142. A pair of fan blade support members or disks 152 are arranged toward opposite ends of the fan 142. One or more disks 152 may be arranged along the length of the fan 142. Each fan blade support member 152 is connected to and radially extends from the hub 146.

As shown in FIGS. 14 and 15, opposite ends of the fan blades 150 are arranged in general axial alignment relative to each other. The center portion of each fan blade 150 is, however, offset in circumferential relation relative to the opposite end thereof such that the fan blade 150 slants or tapers toward a peripheral center portion of the fan whereby each fan blade 150 has a chevron-like configuration between opposite ends thereof. The resultant flow of air off the blades 150 is directed outwardly toward the fan ends in a manner improving fan performance by lessening end air effects and thereby providing a generally uniform air distribution across the width of the cross-flow fan 142. Slanting of the fan blades 152 furthermore has proven to reduce operating noise (sound) levels of the fan 142. Accordingly, higher fan speeds can be used to increase the output flow of air from the fan 142 without concern over environmental noise pollution.

To further reduce the end air effects at opposite ends of the fan 142 and thereby effectively increase the cleaning area of the combine without increasing the width thereof, each of the fan blade supports 152 includes a series of elongated or slotted openings 2 12 therein. The elongated openings serve the same purpose as the openings 112 described above. That is, the openings 212 serve to allow air to pass into the open center of the fan 142 from opposite ends and be subsequently exhausted in a manner reducing or eliminating end air effects normally associated with cross-flow fans Yet another aspect of the present invention relates to a method for enhancing cleaning of crop materials in a cleaning section of an agricultural combine. According to the present invention, the improved method comprises the steps of: arranging a transversely elongated cleaning fan in front of and beneath the cleaning section of the combine such that air flow from the fan separates chaff from the grain. The elongated cleaning fan includes a plurality of elongated fan blades arranged in a cylindrical pattern about an elongated rotational axis of the fan. The blades are supported by at least two disk shaped blade supports arranged toward opposite ends of the fan and that radiate outwardly from the axis of the fan. The method according to the present invention further includes the step of providing openings in the disk shaped blade supports such that upon rotation of the fan air is drawn inwardly thorough opposite end of the fan thereby eliminating end air effects and thereby enhancing the cleaning action of the combine by producing a substantially constant flow of air across the entire length of the fan.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A transverse fan assembly, comprising:

an elongated air plenum defining inlet and outlet openings a fan rotatably disposed within said air plenum for drawing air in through said inlet and blowing air from said outlet, said fan defining an elongated axis of rotation, a plurality of elongated fan blades extending in an axial cylindrical pattern about said axis, and two disk shaped fan blade mounting members arranged toward opposite ends of said fan, with each blade mounting member having a centrally disposed hub defining the elongated axis of said fan, and wherein each blade mounting member drives the fan blades whereby establishing an air flow through the inlet opening and from the outlet opening, and wherein each fan blade mounting member is apertured such that air is drawn through the mounting member at opposite ends of the fan to effect a substantially even flow of air from the outlet and along the length of the fan upon rotation of the fan; and wherein the outlet opening of said air plenum axially extends across the length of said fan and the inlet opening extends axially across the length of and circumferentially about that portion of the fan arranged above the elongated axis of the fan for defining an enlarged air opening, and wherein opposed ends of the air plenum are likewise open in that region extending above the axis of the fan to promote the ingress of air into and through the center of the fan.

2. The transverse fan assembly according to claim 1 wherein each fan blade the mounting member defines an army of circularly arranged slots defined toward the periphery of the mounting members for allowing a fan blade to pass endwise therethrough, each fan blade being releasably locked in a slot to facilitate replacement of the fan blade, and wherein each slot is configured to promote the endwise passage of air through the fan blade mounting member inwardly toward an open center of the fan to further enhance a substantially even flow of air from the fan.

3. The transverse fan assembly according to claim 1 wherein each fan blade is releasably interconnected to the blade mounting members to allow for repair and replacement of the fan blades.

4. The transverse fan assembly according to claim 1 wherein said air plenum defines a scroll-shaped chamber wherein said fan is rotatably disposed to drive air between the inlet and outlet openings.

5. The fan assembly according to claim 1 wherein a center portion of each fan blade is angularly offset from respective end portions thereby providing each fan blade with a chevronlike configuration between opposed ends for enhancing performance characteristics of the fan assembly.

6. A transverse fan assembly, comprising:

a plurality of elongated fan blades extending in an axially elongated cylindrical pattern, with each fan blade slanting toward a peripheral center portion of the fan such that each elongated fan blade has a chevron-like configuration between opposite ends of the fan assembly, a central hub defining an elongated axis of rotation of the fan assembly, and a plurality of axially spaced and generally aligned disks of substantially uniform diameter, with each disk being connected for rotation with and extending radially outward from said central hub, each disk defining a series of equally spaced slots disposed toward a peripheral edge thereof for allowing the fan blade to pass endwise therethrough, wherein each slot has an elliptical-like configuration extending radially away from the hub for enhancing air flow in the disk to lessen end effects and providing a substantially constant air flow along the length of the fan assembly, and wherein each disk further defines air openings for allowing air to be drawn inwardly at opposite ends upon rotation of the fan whereby enhancing fan performance by lessening end air effects and providing a substantially constant flow Of air across the entire length of said fan assembly.

7. A cleaning system for an agricultural combine having a threshing apparatus and cleaning sieves arranged in crop receiving relation relative to said threshing apparatus, said cleaning system comprising:

a transversely elongated cleaning fan rotatably driven about a fixed axis located on said combine beneath the threshing apparatus and forward of the cleaning sieves, said fan assembly including a plurality of elongated fan blades extending in an axially elongated cylindrical pattern, with each fan blade slanting toward a peripheral center portion of the fan such that each elongated fan blade has a chevron-like configuration between opposite ends of the fan assembly, a central hub defining said fixed axis, and a plurality of axially spaced and generally aligned disks of substantially uniform diameter, with each disk being connected for rotation with and extending radially outward from said central hub, each disk defining a series of equally spaced slots disposed toward a peripheral edge thereof for allowing a fan blade to pass endwise therethrough, and wherein each disk further defines air openings for allowing air to be drawn inwardly at opposite ends and upon rotation of the fan; and an air plenum having an open extending circumferentially about that portion of the fan disposed above the fixed axis and along substantially the entire length of the fan, said air plenum further including ends which are open in that area above the fixed axis of the fan such that air is drawn axially inwardly along the axis of and through the center of the fan, said air plenum further defining an air outlet for directing a forced flow of air from the fan rearwardly and upwardly through the cleaning sieve to blow chaff toward a rear end of the combine.

8. The cleaning system according to claim 7 wherein each fan blade is releasably fastened to each disk to allow for fan blade replacement.

9. The cleaning system according to claim 7 wherein each disk further includes a blade retainer for individually and releasably securing a fan blade in a respective slot of the disk.

10. The cleaning system according to claim 9 wherein each blade retainer comprises a resilient arm that rotates with the disk and is adapted to releasably engage and urge a respective fan blade radially outward from said hub and against a stop surface defined by the slot in the disk.

11. The cleaning system according to claim 7 wherein said air plenum defined a scroll-like chamber in which said fan is rotatably mounted such that air drawn into the inlet opening has an increased open area as it moves toward the outlet opening.

12. The cleaning system according to claim 7 wherein said air plenum includes an upper air directing baffle, said upper air directing baffle extending generally horizontally rearwardly from a forward edge positioned closely adjacent a rearmost peripheral edge of the fan and upwardly toward the cleaning sieves.

* * * * *